June 4, 1963 W. H. WOOD 3,092,049
INDIVIDUAL DISPOSAL UNIT
Filed June 30, 1960 7 Sheets-Sheet 1

Inventor
WILLIAM H. WOOD
By Soans, Anderson, Luedeka & Fitch
Attys

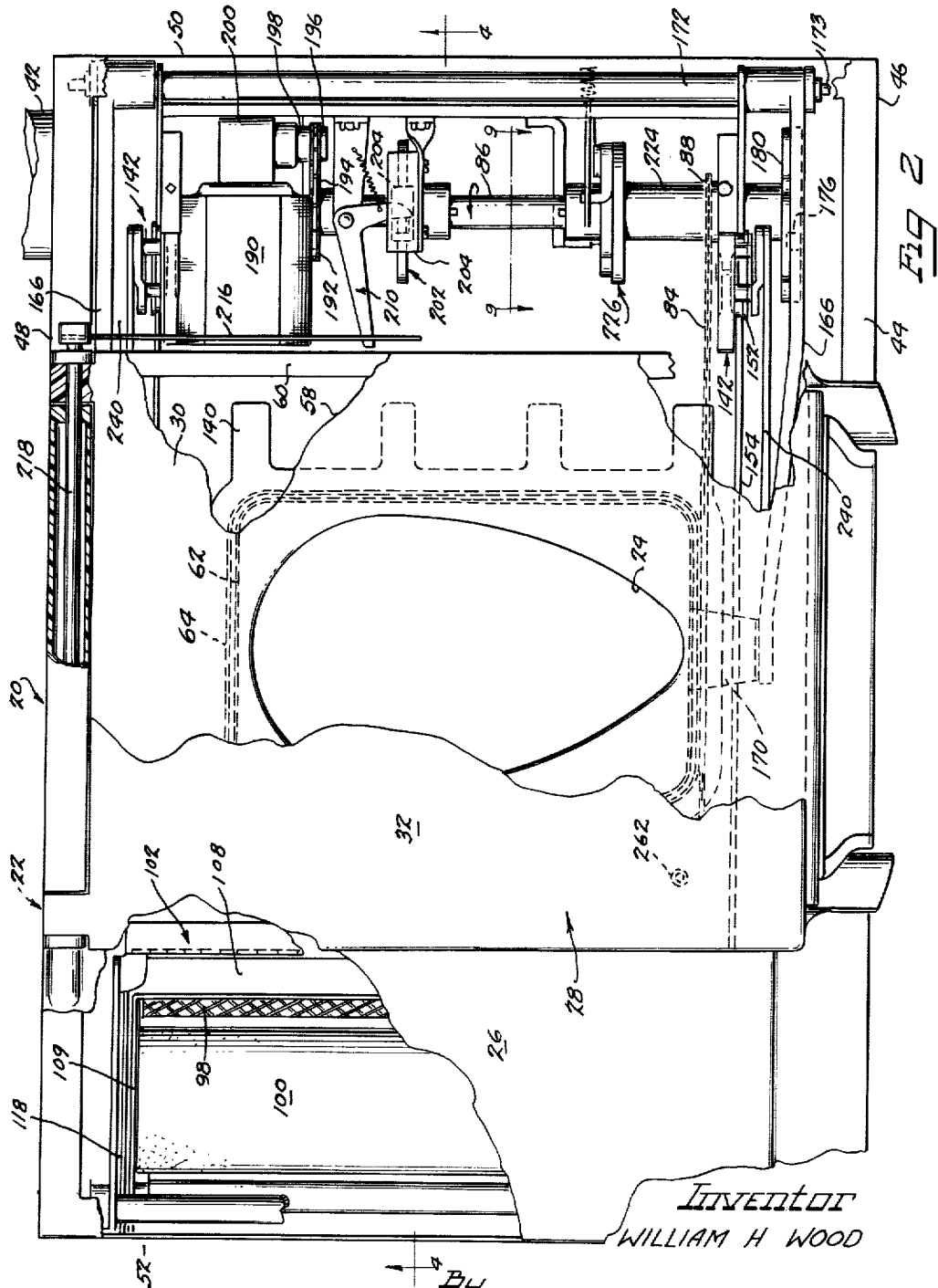

June 4, 1963

W. H. WOOD 3,092,049

INDIVIDUAL DISPOSAL UNIT

Filed June 30, 1960

Inventor
WILLIAM H WOOD
By Soans, Anderson, Luedeka & Fitch
Attys

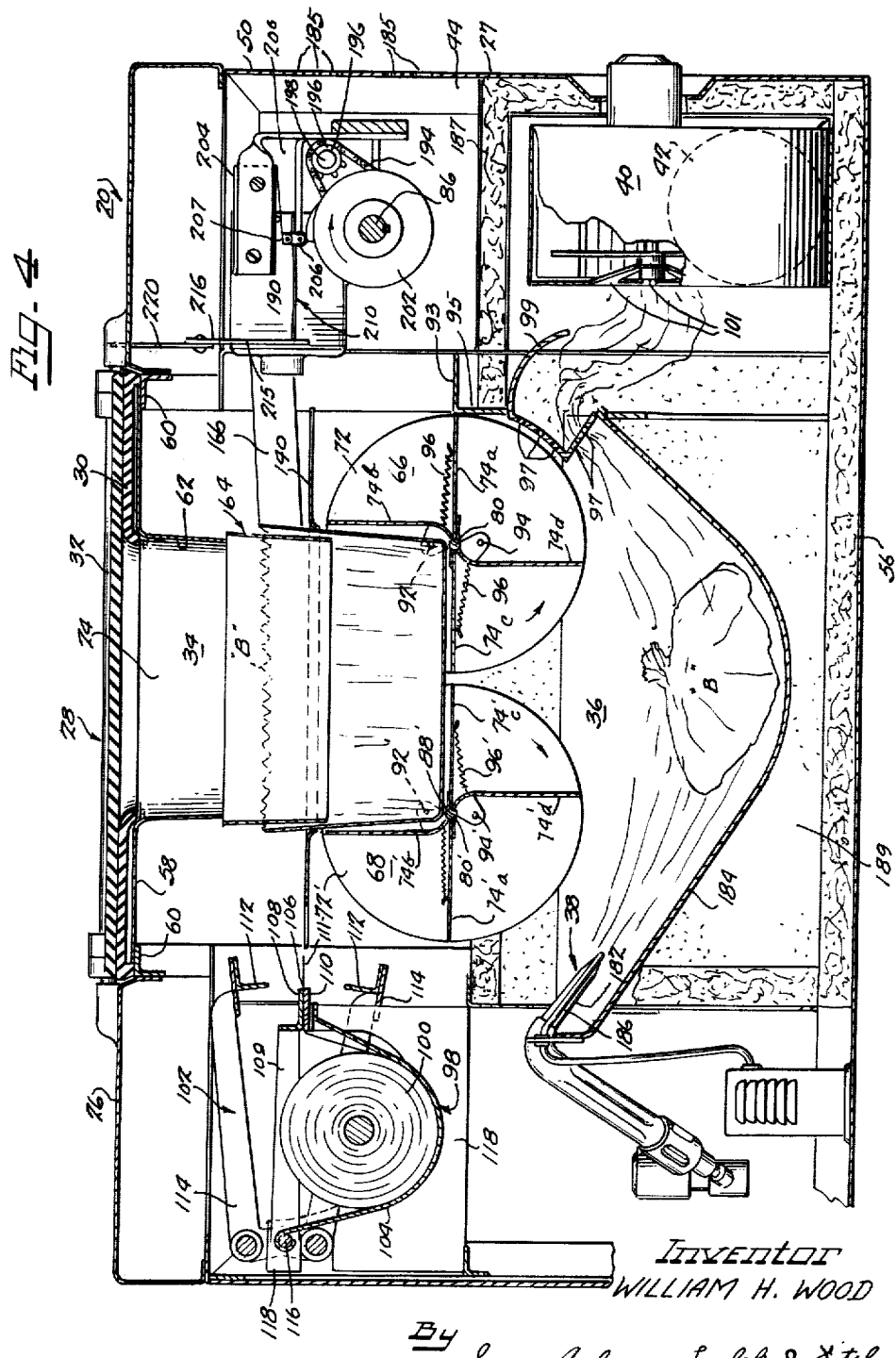

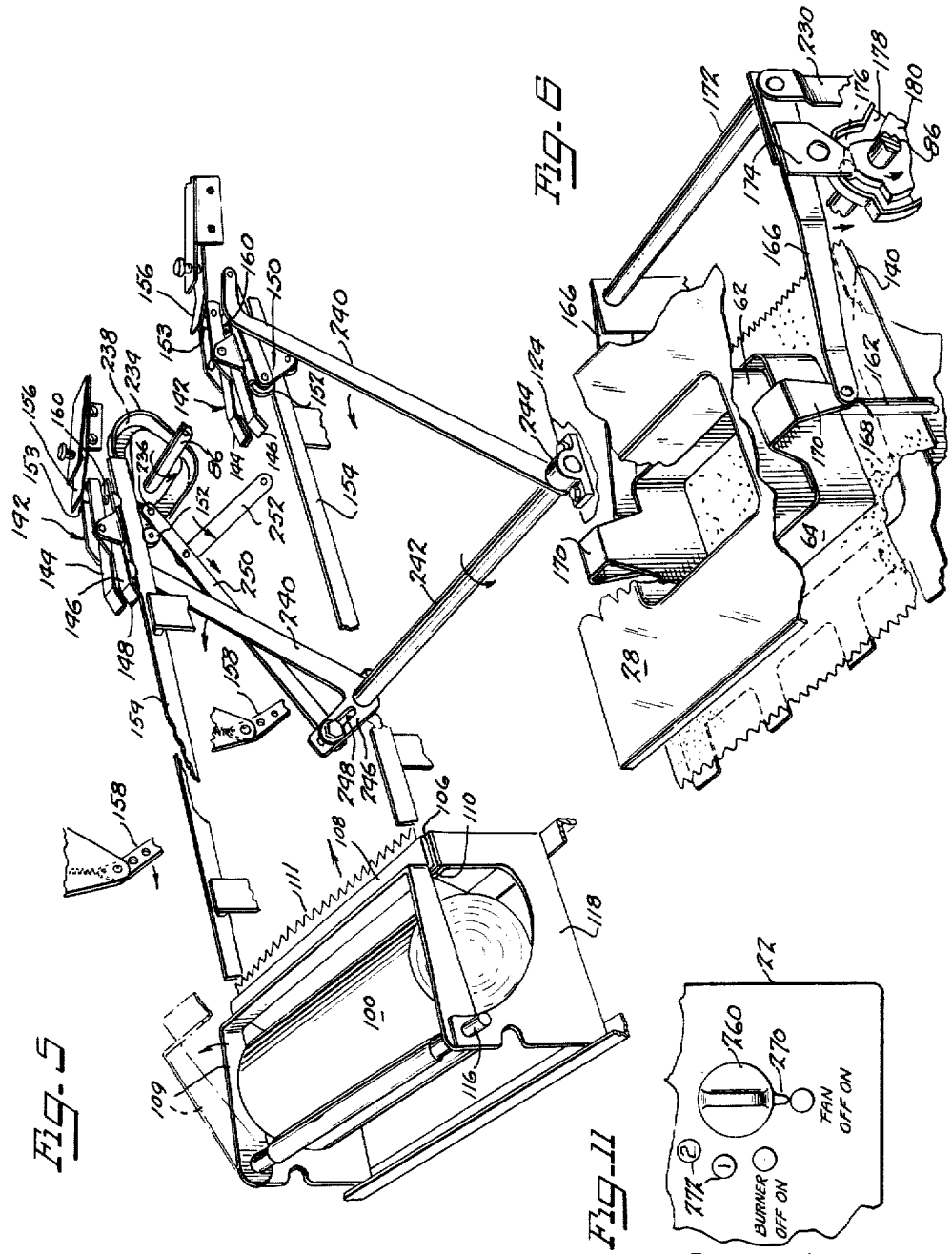

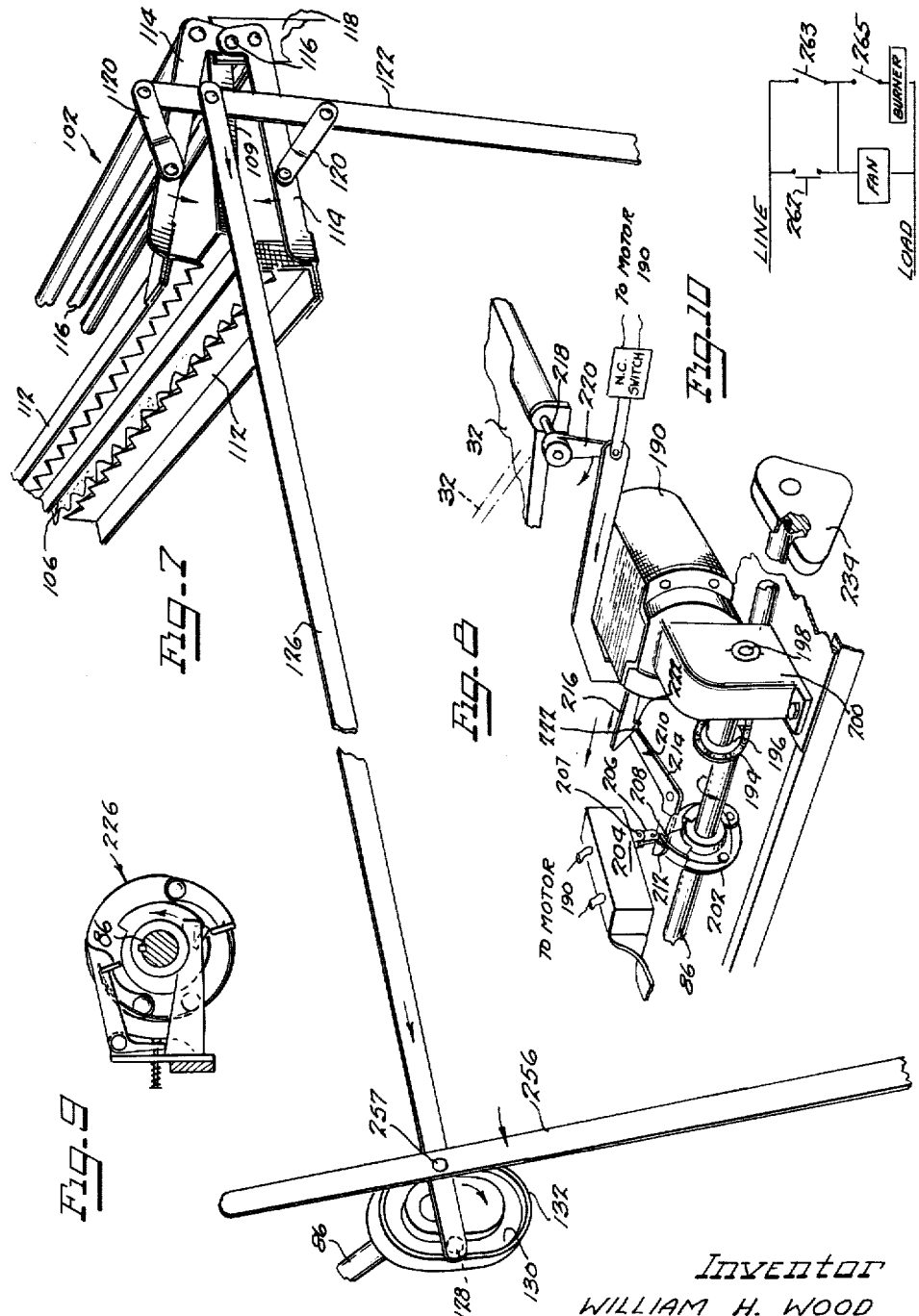

June 4, 1963 W. H. WOOD 3,092,049
INDIVIDUAL DISPOSAL UNIT
Filed June 30, 1960 7 Sheets-Sheet 7
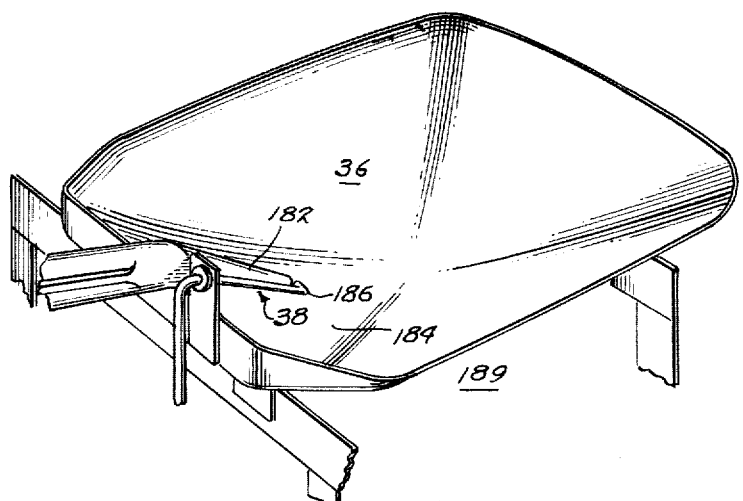
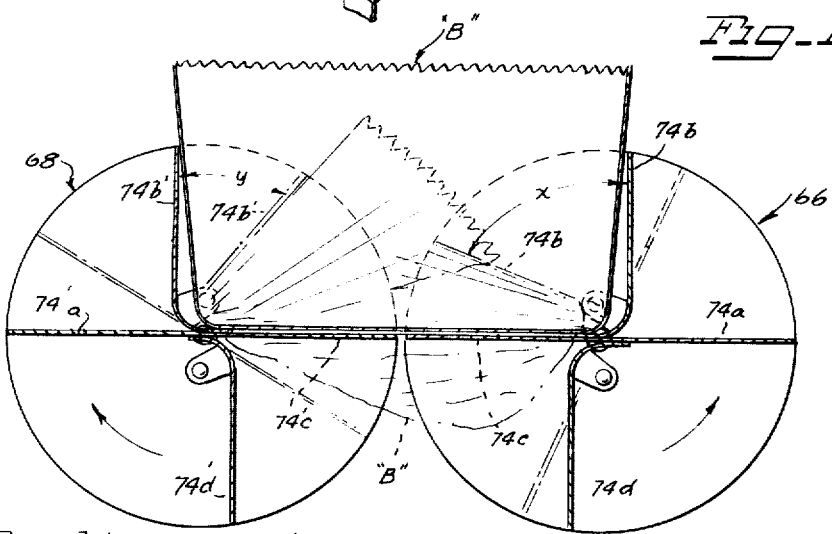
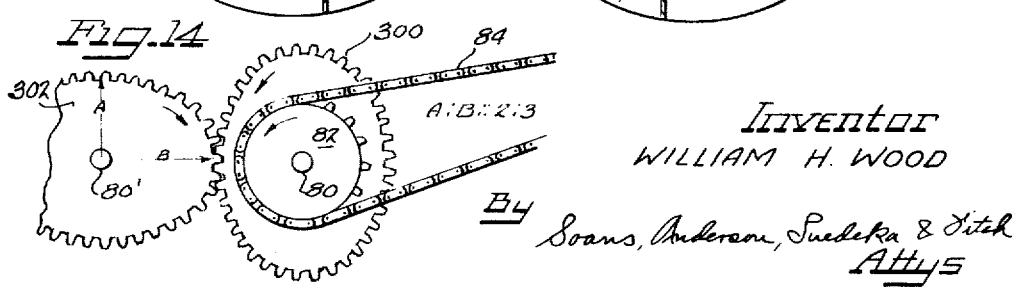
Inventor
WILLIAM H. WOOD
By Soans, Anderson, Suedeka & Fitch
Attys

United States Patent Office 3,092,049
Patented June 4, 1963

3,092,049
INDIVIDUAL DISPOSAL UNIT
William H. Wood, Chicago, Ill., assignor to Ken-Lab.
Inc., Walworth, Wis., a corporation of Delaware
Filed June 30, 1960, Ser. No. 40,095
8 Claims. (Cl. 110—9)

This invention relates generally to an individual disposal unit and is more particularly directed to a dry sanitary closet having a crematory means for consuming the waste products.

The disposal of sewage waste materials is an ever increasing problem, and in many localities dangerous sanitary conditions exist or are imminent because of the greatly overburdened condition of the sewage handling facilities. The sewerage systems and the sewage treatment facilities generally have not been able to keep pace with the population growth in many areas. Furthermore, the conventional waste handling systems rely on the use of water as the media for handling and transporting the waste material and, as a result, a very substantial portion of all water used by mankind is required solely for the handling of waste materials. Consequently, there is considerable demand for a more satisfactory means for handling waste materials than the conventional water-borne form of sanitation means which utilizes a vast quantity of water, which is often in short supply, and which requires extensive and costly sewerage systems as well as expensive sewage treatment plants.

In addition, there are many instances in which the handling of waste materials is necessarily an individual problem since there are no existing sewerage systems. As an example, the lack of a sewerage system in many newly developed suburban areas has necessitated the use of individual septic tanks, or the like, which involve relatively large tile fields for drainage and which involve troublesome maintenance and cleaning problems. Moreover, such individual liquid-borne sewage handling and treating means require larger lots for the individual homes in order to meet sanitation requirements, and in general are not too satisfactory in their operation.

In certain other instances, such as on moving vehicles, busses, airplanes, and in connection with the needs of transient groups, such as mobile military personnel, there is generally no opportunity for the use of any of the usual water-borne forms of sewage handling and other measures must be taken. Generally, such situations are handled on a temporary basis by the use of chemicals which retard septicity until such time when the waste can be transferred to a sewage disposal facility, or by the use of other chemicals which accelerate the decomposition of the waste material.

It is seen, therefore, that serious and pressing problems exist with respect to the known methods for handling sewage, particularly with respect to the quantity of water used and with respect to the time and expense involved in collecting such material for treatment and in reducing the sewage to a substance which is sufficiently deactivated and non-toxic for final disposition in a flowing stream or other large body of water. The collection of water-borne sewage also frequently poses problems with respect to the establishment of a septic condition of the sewage while in transit in the sewerage system, which condition is often accompanied by noxious odors that are noticeable at ground level. Furthermore, even with modern advances in the treatment of liquid-borne sewage, almost every metropolitan area is currently encountering problems with respect to the disposal of the effluent from the sewage treatment plant. The major problem in this respect usually concerns the resulting contamination of the body of water receiving the effluent, but in one major instance there is also involved a problem with respect to the diversion of the flow of water for the purpose of handling such sewage.

Various forms of dry sanitary closets have been designed heretofore, but they have not been widely accepted either as a suitable substitute for the conventional water closets which discharge into a sewerage system, or for septic tanks and the like.

It is the principal object of this invention to provide an individual disposal unit which eliminates the difficulties mentioned above by eliminating the use of water in the handling of sewage and by providing for cremation of the waste material to an extent such that essentially the only product remaining after cremation is an innocuous gas which is exhausted to the atmosphere from the unit. Another object is to provide an individual disposal unit of the crematory type, which handles the waste material in a completely sanitary manner, through use of a disposable receptacle for the waste material which is consumed by the unit along with the waste. A further object of the invention is to provide a disposal unit of the type referred to above, which automatically operates, upon initiation by the user, to provide a disposable receptacle for the waste material, to create a flow of air through the unit at a rate which is in excess of that required for combustion of the waste materials within the unit and which is effective to trap all gases within the unit and exhaust them to the atmosphere, to deposit the receptacle and waste material in package form in a combustion chamber, and to ignite the crematory means in the combustion chamber and operate such means for a predetermined length of time sufficient to consume essentially all of the waste material and the disposable receptacle. Additional objects and advantages will be apparent from the following description of the selected embodiment, which is illustrated in the drawings (7 sheets), wherein:

FIGURE 2 is a plan view of the apparatus with portions broken away and in section;

FIGURE 3 is a rear view of the apparatus, with the covering panel removed in order to clearly illustrate the internal mechanism as seen from the rear of the unit;

FIGURE 4 is a sectional view taken along the line 4—4 in FIGURE 2;

FIGURE 5 is a fragmentary, perspective view of mechanism seen particularly in FIGURE 1, with portions broken away in the interest of clarity;

FIGURE 6 is a fragmentary, perspective view of portions of the apparatus seen particularly in FIGURES 2 and 4, illustrating particularly the formation of the disposable receptacle or lining;

FIGURE 7 is a fragmentary, perspective view of certain mechanism in the apparatus, which is also seen in FIGURE 3;

FIGURE 8 is a fragmentary, perspective view of the main drive mechanism for the apparatus, which is also seen particularly in FIGURE 2;

FIGURE 9 is a sectional view taken along the line 9—9 in FIGURE 2;

FIGURE 10 is a wiring diagram for a portion of the electrical control means used in the apparatus;

FIGURE 11 is a fragmentary, plan view of the apparatus, showing the timer control for the burner mechanism and blower fan;

FIGURE 12 is a perspective view of the combustion chamber shown particularly in FIGURE 4;

FIGURE 13 is a schematic illustration of a modified form of operation of the rotors shown in FIGURES 1–3; and FIGURE 14 illustrates a modified driving connection between the rotors for achieving the mode of operation illustrated in FIGURE 13.

Figure 1:
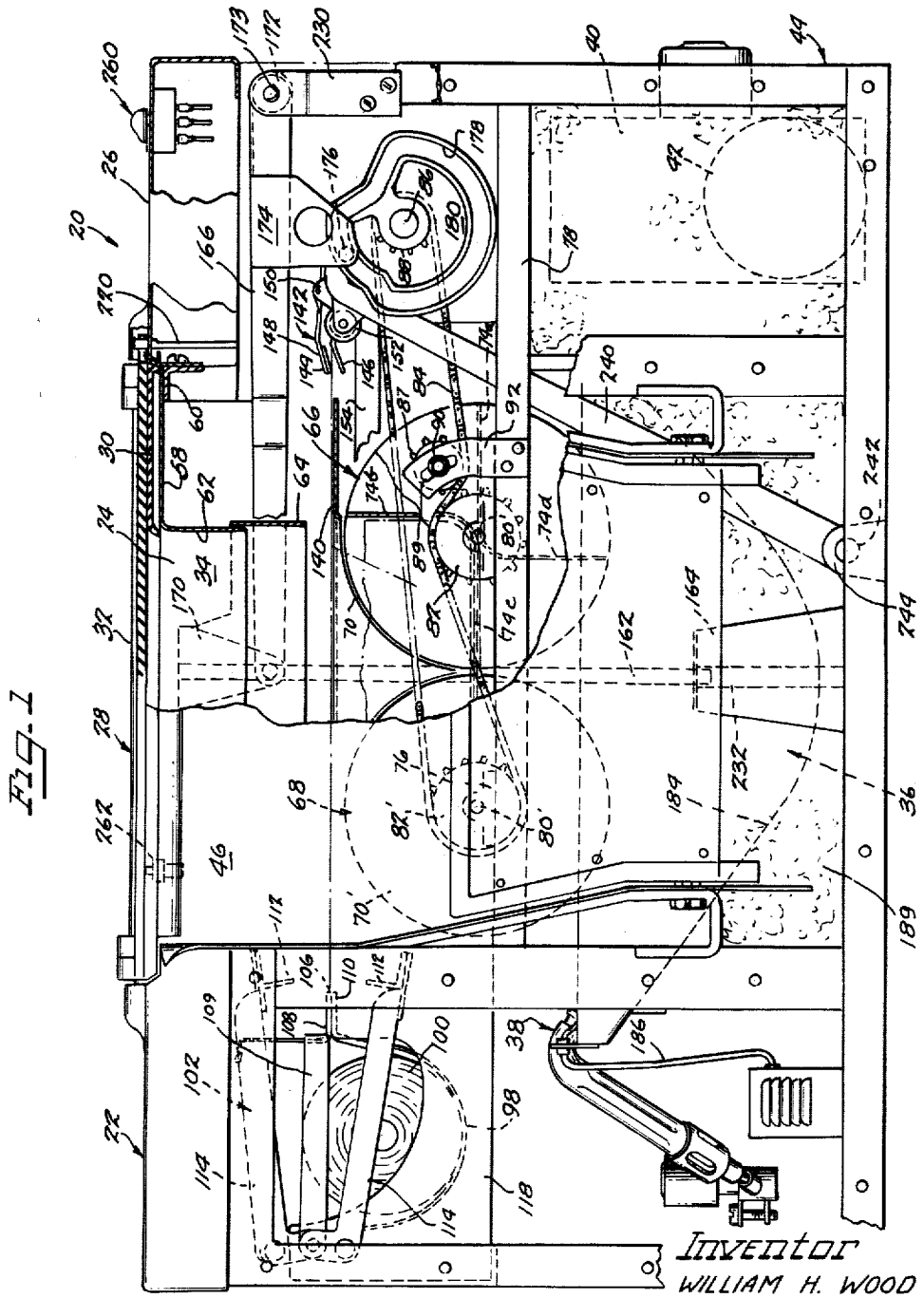
FIGURE 1 is a front view of apparatus embodying principles of this invention, wherein portions of the structure are broken away, shown in section, or indicated by broken lines, in order to illustrate structural details.

With reference particularly to FIGURES 1–4 of the drawings, it will be seen that the illustrated individual disposal unit 20 comprises generally a rectangular housing 22 having an opening 24 in the top wall 26 thereof, and a generally conventional form of toilet seat 28, including an annular seat member 30 and a hinged cover part 32, which overlies the opening 24. Within the housing 22 and beneath the toilet seat, there is provided a depository in the general form of a bowl structure 34, which includes a displaceable bottom-forming portion, and underlying such bottom-forming portion is a combustion chamber 36 including a cremating device in the form of a gas jet burner 38. Adjacent one end of the housing 22 there is disposed a blower fan 40, which is adapted to circulate air through the housing and exhaust it to the atmosphere. The housing 22 also includes means therein for forming a basket-like receptacle from combustible sheet material, including means for withdrawing and severing a predetermined length of such sheet material from a roll and for forming the severed sheet into an open top receptacle disposed in lined relation to the bottom and side walls of the bowl structure.

Briefly, the operation of the unit involves the steps of (1) operation of the blower fan 40 to produce a flow of air through the housing 22 in a path including the combustion chamber 36 and then out the exhaust vent 42 to the atmosphere, (2) lining of the bowl 34 with disposable sheet material, as above mentioned, (3) displacing the bottom-forming sections of the bowl structure in a manner providing for packaging of the waste material within the disposable sheet and depositing the package in the combustion chamber 36, and (4) operation of the gas jet burner 38 in a manner affording essentially complete combustion of the packaged waste material, in the presence of an excess quantity of air as produced by the blower 40.

With the operation of the unit in the described manner, the waste is handled in a dry and sanitary manner without contamination of the disposal unit, and there is essentially only an innocuous gas remaining after the complete consumption of the packaged material in the combustion chamber and this gas is exhausted to the atmosphere. Furthermore, this operation is carried an automatically, in a manner to be described, and so that any odors attendant with the use of the unit are directed to a vent means and prevented from escaping to the atmosphere immediately surrounding the unit. Further, the unit is entirely safe to the user as well as with respect to the building in which such unit is housed.

With respect to the structural details of the selected embodiment, it will be noted that the housing 22 for the disposal unit 20 is formed from metal panels, or the like, which are mounted on a steel frame structure 44 within the housing so as to provide an enclosure having a front wall 46, a back wall 48, a pair of end walls 50 and 52, the top 26, and a bottom 56. Generally, the housing is divided internally into an upper portion and a lower portion, with the latter housing the combustion chamber 36, the blower 40 and the burner 38. The top wall 26 of the housing is provided with the opening 24 over which is hingedly connected a generally conventionally shaped toilet seat 30 having a seat cover 32. The opening 24 communicates with the underlying bowl structure 34 which is generally rectangular in configuration. The upper portion of the bowl structure is formed of sheet metal or the like and defines a hatch which includes an upper horizontal section 58 underlying the toilet seat and supported on the frame members 60, and a depending skirt section 62 defining the hatch opening. An intermediate portion of the bowl structure is provided by a crown or collar-like member 64, which is shaped to closely surround the skirt portion 62 of the bowl 34 and is telescopically movable relative thereto in a manner and for reasons explained hereinafter. The lowermost side and end walls of the bowl structure, as well as the bottom, are provided by a pair of rotor mechanisms 66 and 68 disposed transversely of the housing. The elements comprising these rotors are similarly numbered, with the elements of rotor 68 having a prime (') suffix. Each rotor comprises a pair of spaced-apart circular end portions 70 and 72 having four transversely extending vanes supported therebetween and indicated by the numerals 74a, 74b, 74c and 74d. These vanes are arranged at 90° intervals, dividing the rotors into quadrants, so that adjoining pairs of the vanes form a portion of one side wall of the bowl structure and one-half of the bottom of the bowl, as seen particularly in FIGURE 4. Consequently, as the rotors 66 and 68 are moved through an arc of 180°, in opposite directions, the vane section of each rotor, which previously formed an upwardly extending side wall portion, assumes a downwardly extending position with a portion thereof extending into the combustion chamber 36, and the following vane section assumes a horizontal position and provides one-half of the bottom for the bowl structure.

Each of the rotors 66 and 68 is suitably journaled within the housing, as by the bearings 76 supported on a pair of frame members 78 (FIGURE 1), and includes an axial shaft 80 having mounted at one end thereof a sprocket 82 in position for driven engagement by a drive chain 84. The drive chain 84 extends to a main drive shaft 86, journaled at the right hand side of the housing 22, upon which is mounted a rotor drive sprocket 88. Consequently, rotation of the shaft 86 and drive sprocket 88 will simultaneously effect rotation of the two rotors 66 and 68 in opposite directions and at the same speed. It will also be noted that an idler sprocket 87 is disposed in position to retain the drive chain 84 in positive engagement with the sprocket 82 on rotor 66, as well as to provide for adjustment of the tension in drive chain 84 and for small adjustments of the positions of the vanes in rotor 66 relative to those on rotor 68. These adjustments are provided for by suitably rotatably mounting the shaft 90 of the sprocket 87 in an arcuate slot 89 which is formed in a supporting plate member 92. The bearing for shaft 90 is adjustably fixed in position along the slot 89 to thereby determine the tension on chain 84 and/or adjust the relative positions of the vanes on the rotors 66 and 68.

With reference particularly to FIGURES 1 and 4, it will be noted that the rotors 66 and 68 extend downwardly into the lower section of the housing and into the combustion chamber 36 at a position below the side walls of the combustion chamber. Moreover, it is preferred that these rotors, particularly the vanes 74a–74d thereon, be disposed in quite close relation to a pair of transversely arranged end plate structures 93 and 95 (FIGURE 4) within the housing, in order to prevent material which might possibly cling to the vanes from moving back into the upper part of the housing, and also to restrict the passage of air in this region. As additional aids in these latter respects, there is provided a foraminous plate or screen 97 and a downwardly curving air baffle plate 99 which extend across the end of the combustion chamber 36 nearest the blower fan 40. The screen 97 has its upper portion disposed in close relation to the path of the rotor vanes 74a–74d and follows the curvature of such path. The primary function of this screen is to serve as a spark arrester and prevent incompletely burned particles from being drawn out of the combustion chamber by the fan 40. The air baffle 99 is disposed so as to direct the air currents leaving the combustion chamber 36 toward the intake openings 101 in the side of the blower fan 40.

As noted particularly in FIGURE 4, the vanes 74a–

74d of each rotor are formed from essentially three plate structures, with such plate structure including sections disposed so as to provide substantially 90° spacing of adjoining vane elements. More particularly, the vanes 74a and 74c are formed of a single plate extending the full diameter of the rotor and fixed to the rotor shaft 80. The vanes 74b and 74d each comprise a plate structure which is mounted for pivotal movement relative to the end discs 70 and 72, at pivots 92 and 94, respectively, for movement about axes eccentric to the main axis of the rotor provided by the shaft 80. In addition, each plate structure forming the vanes 74b and 74d, respectively, is biased into its quadrant forming position by springs 96, thereby providing for yielding movement of the vanes 74b and 74d relative to the rotor proper in the event they encounter an obstruction during their movement.

At the left hand end of the housing 22, as seen in FIGURES 1, 2 and 4, there is provided a support 98 for a roll 100 of combustible, fluid impervious sheet material, such as a suitably coated paper or the like, and severing mechanism 102 for transversely cutting the paper from the roll. More particularly, the roll of paper is loosely supported in a hammock 104, and the leading edge of the paper roll is inserted through a guide slot 106 formed between a pair of transverse guide members 108 and 110. The upper guide member 108 is mounted on a pair of arms 109 for pivotal movement about the supporting shaft 116, in order to permit upward swinging movement of member 108 out of the way for insertion of the roll 100 in its support 98. The leading edge of the sheet material is then placed across the lower guide member 110 and member 108 is swung downwardly for cooperation with member 110 in forming guide slot 106 and holding the leading edge 111 of the sheet in position for engagement by a sheet withdrawal means. The roll of paper is of a width greater than the front to rear measurement of the bowl structure 34 for reasons which will become apparent hereinafter.

The sheet severing mechanism 102 within the housing 22 includes a pair of transversely disposed cutters 112, which are movable through an arc toward and away from each other. Each of these cutters is mounted at opposite ends thereof on one end of a pair of bell-cranks 114, which in turn are supported at their other end on a common pivot 116 carried by side frame members 118. An intermediate portion of each arm 114 is pivotally connected by links 120 (FIGURE 3) with vertically spaced portions of a rocker arm 122 which is pivoted at its lower end on a lower frame member 124. A portion of the rocker arm 122, intermediate the links 120, is in turn pivotally connected to an actuating link 126 which is adapted to be oscillated lengthwise to effect operation of the cutters 112. The opposite end of the actuating link 126 is provided with a cam follower 128 in position for engagement with a groove 130 in a cutter cam wheel 132 which is fixed on the main drive shaft 86. Operation of the cutter cam 132 is, therefore, effective to move the cutters 112 toward and away from each other in a path intersecting the path of movement of the sheet material so as to cut the sheet after a desired length thereof has been withdrawn from the roll 100.

The sheet material, which is provided in the housing 22 and severed as indicated above to provide predetermined lengths, is utilized in the formation of a disposable receptacle or basket B (FIGURE 4) lining the walls and bottom of the bowl structure 34. The provision of such basket affords handling of the waste in a dry, sanitary manner and without contamination of the disposal unit. In order to form the receptacle B, the sheet material is drawn across the bowl at a position above the rotor mechanisms 66 and 68, and the sheet is then severed by the cutters 112 to provide a predetermined length of sheet material in position across a guide plate 140 disposed at an intermediate portion of the bowl structure and above the rotors. In this respect, it will be noted particularly in FIGURES 3 and 5 that there is provided a pair of gripping fingers or duck bills 142, which are operable to grasp the free edge of the paper extending through the guide slot 106 and move the paper across the guide plate 140 (FIGURE 4). The duck bills 142 each comprise two relatively movable finger elements 144 and 146, which are spring-biased into a normally closed, gripping relation between the forward ends of the fingers, and these forward ends are preferably covered on their inner surface with a soft, friction-producing substance, such as rubber, as indicated at 148. Further, each pair of fingers is mounted on a trolley-like frame structure 150 including a set of three wheels or pulleys 152, which are triangularly spaced and adapted to engage and move along one of a pair of guide rails 154 disposed along opposite sides of the housing 22.

The upper finger 144 of each pair is pivotally mounted on the trolley 150, and this upper finger includes at its rear a rotable cam follower 153, which is adapted to engage a cam plate 156 at one end of its run to open the fingers to release the paper, and to engage an actuating arm 158 at the other end of the run on the guide rail to again open the fingers in readiness for initial engagement with the paper. Intermediate these positions, the fingers are held in closed position by the spring 160 joining them. More particularly, as the trolleys 150 move to the left along the guide rails 154, as viewed in FIGURE 5, the cam followers 153 each engage the associated actuating arm 158, which is spring biased to the position shown in FIGURE 5, and continued movement of the duck bill 142 in engagement with the actuating arm 158 causes the upper finger 144 to move away from the lower finger 146, so as to position the fingers in readiness for grasping therebetween the relatively short length of sheet material extending from the paper guide slot 106.

As the open fingers move into position to grip the paper, they move away from the actuating arms 158 so that the compression spring 160 causes the fingers to close and grip the sheet. The duck bills 142 are then withdrawn along rails 154, by means to be described later, to move the paper across the housing to a position substantially coextensive with the guide plate 140, and the paper is then cut from the roll by the operation of the cutters 112. The fingers 144, 146 of the duck bills 142 are then opened, through engagement of the cam followers 153 by the cams 156, to release the sheet in overlying relation to the guide plate 140. At this stage of operation, the crown or collar 64 is moved downwardly and internally of the rotor mechanism 66, 68, and the crown 64 carries the paper sheet with it and forms the paper into an open top receptacle by pressing it through the central opening in guide plate 140 to thereby form a basket which is retained against the side wall portions provided by the vanes 74 and the circular end members 72 of the rotors, as seen in FIGURE 4. The crown 64 then retracts to its elevated position of telescoping relation with the skirt 62 (FIGURE 1).

The disposable basket forming operation just described may also be noted from FIGURE 6, wherein it is seen that the crown 64 is connected at its opposite ends to a guide rod 162, which is suitably guidably supported in a base member 164 (FIGURE 1), in order to assure precise alignment and vertical movement of the crown. Such vertical movement is effected by a pair of arms 166, each having an end portion pivotally connected at 168 with a projecting flange section 170 of the crown. The other end of each arm or lever 166 is fixed to a hollow cross shaft 172, which is rotatable on an elongated center shaft 173 suitably journaled at its opposite ends on the frame 44. An intermediate portion of one arm 166 includes a depending bracket 174 having a cam follower 176 rotatably mounted thereon, and the follower 176 is disposed in a cam groove 178 provided on a cam 180 which is fixed to the main drive shaft 86 for rotation therewith.

The crown cam 180 is designed so that a predetermined rotation of the drive shaft 86 affords the aforementioned reciprocal vertical movement of the crown 64 relative to the upper and lower portions of the bowl structure 34.

It should also be noted, in connection with the basket forming operation of crown 64, that a similar result might be achieved by using the hopper or skirt 62 as the die in forming the disposable basket. In such instance, the cam 180 is suitably modified so that crown 64 is initially disposed within the walls 74b and 74b' of the rotors and the sheet material is deposited in overlying relation to the crown 64. The crown is then moved upwardly to press the sheet against the lower edge of the skirt 62 and form the basket along the outside surfaces of this skirt section. Subsequent downward movement of the crown 64 will carry the formed basket with it, and the crown and basket can remain within the lower bowl portion provided by rotors 66 and 68 until after the waste material has been deposited. The crown will then be raised out of the way of the rotors and the latter will be rotated so as to package the waste and deposit it in the combustion chamber 36.

After the disposable receptacle or basket B has been provided and the disposal unit has been used, by depositing waste material therein, the rotors 66 and 68 are actuated to simultaneously effect 180° rotation of the rotors. During such motion, the vertically extending vanes 74b and 74b', which move downwardly in opposite directions and toward each other, are effective to fold the side walls of the receptacle toward each other. Furthermore, as the bottom forming vanes (74a, 74a') move downwardly and away from each other, the filled receptacle is permitted to collapse somewhat. As a result, the opposite sides of the disposable receptacle are brought together and the receptacle, is converted into a completely closed package, which drops into the lower portion of the housing to the bottom of the combustion chamber 36 therein.

The combustion chamber 36 in the lower portion of the housing 22 is, of course, disposed directly beneath the bowl 34 described above, and the walls of this chamber are contoured (FIGURE 12), so that there are no ledges or corners to collect dirt or obstruct the free passage of the packaged waste material into the lowermost portion of the combustion chamber 36. In this respect, it is preferred that the side walls of the chamber 36 be rather sharply inclined and that there be essentially no flat section along the bottom. The side walls and bottom of the combustion chamber are, of course, shielded on their outer surfaces by insulating material to prevent heat transfer to the outer walls of the disposal unit housing. Then too, if desired, the interior of the combustion chamber may be suitably lined with fire-resistant material, such as a ceramic coating, bricks, or other refractory material.

At one end of the combustion chamber 36, to the left in FIGURE 1, there is provided a crematory means in the form of the gas-jet burner 38. This burner includes a nozzle 182 (FIGURE 4) which is disposed parallel with the adjacent lower wall 184 of the combustion chamber 36, to thereby direct the flame toward the bottom of the chamber, with the nozzle being designed to produce a fan-like flame with most intense portion of the flame at a location directly beneath the center of the bowl structure 34. The gas-jet burner 38 may be of any known type capable of producing heat within the range of about 800 to 2000° F. This burner includes an igniter and the usual safety controls, including a flame detector 186 and a safety shut-off in the event that the flame goes out or fails to ignite within a given time. The burner may be of a high pressure type, wherein bottled gas having a pressure within the range of 25 to 40 pounds per square inch may be used, or it may be a burner adapted for use with conventional, low-pressure LP gas or natural gas. In the latter two instances, the normally available pressure is quite low and does not produce the intense heat required and, therefore, a small blower is added to induce air into the nozzle at a high velocity and thereby maintain a proper fuel-air ratio in the nozzle to achieve the 800° F. to 200° F. temperature that is desired for proper operation of the disposal unit.

At the other end of the housing 22, i.e., to the right in FIGURE 4, there is provided the blower fan 40, preferably of the squirrel cage type, which is adapted to induce air at a relatively high velocity across the combustion chamber 36. The fan 40 is in communication with the opening 42 in the side of the housing for exhaustion of the air through a suitable conduit means to the outside atmosphere. The blower fan 40 cooperates with means defining air passages in the housing so as to provide an excess amount of air in the combustion chamber 36, with respect to the amount required to support ordinary burning, and provide more efficient and accelerated combustion of the waste material in the chamber. Furthermore, the blower fan is of a capacity which is effective to provide a reduced pressure in the housing relative to the atmosphere, so that all gases are exhausted through the vent 42 and cannot otherwise escape from the housing.

More particularly, the fan 40 is enclosed in a lower section of the housing 22 (FIGURE 4) and essentially has direct communication only with the combustion chamber 36 and the vent 42. The combustion chamber 36 is substantially closed off from direct communication with the upper portion of the housing, during operation of burner 38, by the rotors 66 and 68, but the left end of the combustion chamber which includes the burner 38 is open to the connecting portion of the housing 22. Apart from the seat opening 24, which is normally closed off during operation of the burner 38 and fan 40, either by the cover 32 or an occupant using the disposal unit, the only openings affording entry of air into the housing are several small openings 185 in the wall 44 directly above the enclosure for the blower fan 40. An insulated horizontal wall 187 separates the upper section of the housing from the fan 40 and, consequently, operation of the blower fan induces a flow of air through the openings 185, across the upper portion of housing 22, down into the housing section for the burner 38, and thence through the combustion chamber 36 and into the fan. The movement of the air is effected at a rate such that the pressure within the housing 22 is slightly below atmospheric, and the directed flow of air through the housing provides: (1) cooling of the elements in the upper portion of the housing in a manner making seat 30 comfortable for an occupant, (2) an insulating layer of air at the upper portion of combustion chamber 36 to protect rotors 66 and 68 from becoming dangerously hot, (3) an insulating layer of air between the flame produced by burner 38 and the bottom 184 of the combustion chamber, and (4) air currents effective to literally spread the flame of burner 38 and thereby contact a greater area of the packaged waste material. Furthermore, the insulated housing portion including the combustion chamber 36 provides a space 189 beneath the chamber, and this space is sufficiently open at its opposite ends to permit flow of air through the space to further cool the bottom 184 of the combustion chamber.

As a result of the described arrangement of the combustion chamber 36, fan 40 and burner 38, it is possible to use very high temperatures in consuming the waste material, without transferring any great amount of heat to other portions of the unit. Consequently, with the illustrated apparatus, continuous use may be made of the unit, and the operation of the burner 38 does not necessitate vacating the seat 28 and closing the cover on the unit. Further, with the reduced air pressure within the housing 22, which is established substantially as soon as the seat 28 is occupied, all odors are drawn into the housing and carried out the vent 42 by the operation of fan 40.

Having in mind the above described operation of the several elements comprising the individual disposal unit, a more detailed description will now be given with respect to the drive mechanism which serves to move the various elements in the described manner.

With reference first to FIGURE 2, it will be noted that the right hand portion of the housing 22 includes, at the upper end thereof, a drive mechanism comprising generally an electric motor 190 and reduction gear 200, which is adapted to be connected with a source of electric current and which operates the main drive shaft 86. The drive shaft 86 extends fore and aft in the housing and is suitably journaled in bearings (not shown) supported on the frame structure 44 within the housing 22. The rear end portion of the main drive shaft 86, i.e., at the top in FIGURE 2, has fixed thereon a sprocket 192 which is connected by a chain 194 with a drive sprocket 196 fixed on a shaft 198 extending from the gear box 200 on the motor. If desired, a slip clutch (not shown) may be disposed on shaft 198 in driving relation to sprocket 196.

Immediately forward of the sprocket 192 on the main drive shaft 96, there is fixedly mounted an actuator cam 202 (FIGURE 8) which is generally in the nature of an overrunning clutch having a peripheral cam surface. The cam surface is disposed in position and operable to control the operation of an overlying electrical switch 204 of the normally open type which controls the actuating motor 190. The rotation of the actuator cam 202 in an anti-clockwise direction, as seen in FIGURE 8, is effective to trip the toggle 206 of the switch 204 and release the switch so that it is held closed for a predetermined length of time. More particularly, the toggle 206 is movable in a generally vertical position, whereby the circuit to the motor 190 is open, when the toggle 206 is in its uppermost position and the circuit is closed when the toggle is allowed to drop to its lowermost portion. The lower end of the toggle 206 includes a collar adapted to ride on the peripheral cam surface of actuator cam 202, and an intermediate pivot 207 permits breaking of the toggle to momentarily move out of engagement with cam 202. The latter movement is effected by a bell-crank 210, which is pivotally mounted on the internal frame structure of the disposal unit housing and operable through movement of the seat cover 32. The bell-crank 210 is disposed with one arm in position for engagement with a latch 216, which in turn is connected with an arm 220 fixed to cross shaft 218 supporting the seat cover for hinged movement relative to the housing 22. The forward end of the latch 216 includes an inclined section defining a rearwardly facing notch 222. The inclined section is adapted to slide over the bell-chank 210, during forward movement of the latch 216, and the notch 222 is adapted to engage the bell-crank and pivot the arm 214 rearwardly during the closing of the seat cover 32. This causes arm 212 to trip toggle 206 to the right in FIGURE 8, thereby permitting the toggle switch to drop to its lower position and close the switch 204. This actuates the motor 190 and starts the rotation of main drive shaft 86. As cam 202 rotates counterclockwise with the main drive shaft 86, toggle 206 is released by arm 212 to ride on a low portion of the peripheral cam surface and maintain the switch 204 closed until the completion of the cycle of operation of the unit drive mechanism. Such cycle involves essentially one revolution of drive shaft 86, whereupon the toggle 206 strikes a high spot on cam 202 and returns to its uppermost position opening switch 204 and shutting of motor 190.

The forward end section of the main drive shaft 86 (FIGURES 1 and 2) has rotatably mounted thereon a sleeve portion 224 which is adapted to be selectively driven by the main shaft 86. More particularly, the rear end portion of sleeve 224 has fixed thereto a clutch 226 of suitable known construction, which is operable to effect rotation of the sleeve 224 with the main drive shaft 86 during a selected portion of the latter's cycle of operation. The sleeve 224 has also mounted thereon the previously mentioned drive sprocket 88 for driving the rotors 66 and 68. With reference particularly to FIGURE 1, it will be seen that the drive sprocket 88 is connected by the chain 84 with the pair of driven sprockets 82 and 82' located, respectively, on the forward end of the center shaft 80 of each of the rotor mechanisms 66 and 68. One run of the chain 84 extends over the right-hand driven sprocket 82, as seen in FIGURE 1, and under and around the other driven sprocket 82', to thereby effect rotation of the rotor mechanisms in opposite directions and at the same speed.

At the forward end of the sleeve 224 and fixed on the main drive shaft 86 is the crown cam 180, which is provided with an internal groove 178 on one face thereof. The cam follower 176 disposed within the groove 178 is rotatably mounted on the lower end of the arm 174 depending from the arm 166, and rotation of the crown cam 180 is therefore effective to cause the crown structure 64 to move vertically. More particularly, the arm 166 is fixed at one end to the cross shaft 172, which is journaled at its opposite ends in the frame members 230, and the other end of this arm is pivotally connected with the bracket portion 170 of the crown 64. As noted particularly in FIGURE 6, the cross shaft 172 has a similar lever 166 fixed to it and connected with the crown 64 at the rear of the latter, in order to assure properly guided vertical movement of the basket forming crown structure 64. Further, there is provided the previously mentioned pair of rods 162, having their upper ends fixed to the brackets 170, which have their lower end portions slidable within guideways provided by collars 232 fixed in the upper portion of the housing structures 164, in order to further guide the vertical movement of the crown 64.

The crown cam 180 is desiged to time the movement of the crown 64 relative to the movement of the other elements of the disposal unit, so that the crown 64 is elevated during withdrawal of the sheet of disposable material across the path of the bowl 34 to position such sheet on guide plate 140, and then the crown is lowered and pressed against the central portion of the sheet to force the sheet through the opening in the guide plate and form the sheet within the lower portion of the bowl structure to provide the basket B. Crown 64 is then again elevated to assume its normal position surrounding the skirt 62, leaving the basket B in the lower portion of the bowl structure. As seen in FIGURE 6, the crown 64 is in its raised position with the paper sheet disposed between the crown and the guide plate 140, in readiness for being pressed by the crown into shape within the vertical wall portions 74b and 74b' of vanes 74 of the rotor mechanisms 66 and 68, to thereby line the lower side walls and bottom of the bowl structure.

Also mounted on the main drive shaft 86 (FIGURES 3 and 5), at the rear portion of the main housing 22, is another internally grooved cam plate 234, which is designed and adapted to effect properly timed movement of the duck bills 142 between their position to the extreme left of the housing 22, as seen in FIGURE 3, and their position to the extreme right at which they initially grip the protruding section of the sheet material carried on the roll 100. With reference also to FIGURE 5, each of the duck bills 142 is slidably mounted on one of the pair of guide rails 154, with the two guide rails being disposed, respectively, along paths at the front and rear of the bowl structure 34 and rotor mechanisms 66, 68. The trolley mechanism 150 supporting the individual duck bills 142 is pivotally connected with the upper end of a lever 240 which extends downwardly in the housing 22 and is fixed to a rotatable cross shaft 242 journaled in bearing members 244 carried by the frame member 124. The lever 240 which is disposed at the rear of the housing 22 (FIGURE 3) is in the form of a bell-crank, with one section 246 comprising a relatively short arm having a slot 248 extending lengthwise of a portion of the arm.

This slot affords adjustable connection with one end of an actuating lever 250, which is connected at its other end with the duck bill cam 234 by means of a cam follower 236 engaging an internal groove 238 in the face of the cam plate. An intermediate section of the duck bill actuating lever 250 is pivotally connected with a guide link 252 which has its other end pivoted to a portion 254 of the frame structure. The rotation of the duck bill cam 234, with the main drive shaft 86, thereby causes the bell-crank lever 240 to move through an arc about its pivot axis in bearings 244 and move the duck bills 142 along the guide rails 154. The travel of the duck bills can, of course, be selectively adjusted through means of the pin and slot connection at the lower end of the actuating link 250.

Also disposed to the rear of the housing 22 on main drive shaft 86 is the internally grooved cam plate 132 (FIGURE 3) which is effective to control the operation of the cutters 112. More particularly, the face of the cutter cam 132 is provided with a groove 130, and riding within this groove is a cam follower 128 which is rotatably mounted on the end of the cutter actuating link 126. A guide arm 256 is used to retain the cam follower 128 in the groove 130, the arm 256 being pivotally connected to the link 126 at pin 257 and having its lower end journaled in bearing means carried on the base frame member 124. The other end of the link 126 is connected to an intermediate portion of the generally vertically extending arm 122, which has been described above in connection with the structural arrangement of the cutters 112. The rotation of the cutter cam 132 moves the actuating link 126 generally longitudinally, to thereby cause the cutters 112 to pivot about their common axis 116 for movement toward and away from the plane of the sheet material which is withdrawn through the slot 106 by the duck bills 142, as the sheet rests on the guide plate member 140.

It will be seen from the foregoing, therefore, that the described drive mechanism is actuated by closing of the seat cover 32 and such mechanism is effective to raise and lower the receptacle forming crown 64; to move the duck bills 142 back and forth across the housing 22 and operate the gripping fingers 144 and 146 thereof so as to position the disposable sheet material between the crown 64 and the bottom portion of the bowl structure provided by the rotor mechanism 66, 68; and to turn the rotor mechanisms 66, 68 so as to wrap and discharge the contents thereof and position a new series of vanes in bowl forming relation.

In addition to the foregoing operations attendant to the packaging of the waste material and the depositing thereof in the combustion chamber 36, there is provided means for selectively and automatically controlling the burner 38 and fan 40 so as to effectively cremate the packaged waste material after it has been deposited in chamber 36. The fan 40 is started as soon as the seat 28 is occupied and the seat portion 30 is depressed to close a button switch 262 (FIGURE 1) which closes the fan circuit (FIGURE 10). The fan continues to operate and circulate air through the housing 22 in the described manner as long as switch 262 is depressed.

Further control of fan 40, as well as burner 38, is effected by a timer switch 260 (FIGURES 1 and 11) disposed on the upper surface 26 of housing 22. The timer 260 is of a known type of spring biased timer control which unwinds at a predetermined rate when wound through a predetermined arc. As illustrated schematically in FIGURE 10, timer 260 controls an electrical circuit including a switch 263 which is arranged in parallel with seat switch 262 and also controls fan 40, and a switch 265 controlling only burner 38. As the timer is turned clockwise (FIGURE 11) from its "Off" position, suitable mechanism such as a timer cam (not shown) closes both switch 263 and switch 265 to start the burner 38, and also fan 40 if the latter is off because the seat switch 262 is open. Preferably, however, the timer is operated while seat 28 is still occupied and blower fan 40 is operating by virtue of seat switch 262 being closed. In such case the turning of the timer 260 is only effective to start burner 38, but continued operation of the blower 40 after seat switch 262 is released is then controlled by timer 260 through switch 263. As timer 260 rotates counter-clockwise for a period of time, as determined by the "wound" setting of the pointer 270 relative to the numbered buttons 272, it holds switches 263 and 265 in closed positions until the pointer 270 reaches position the "Burner Off-On" position, at which switch 265 opens to shut off burner 38. The fan 40 continues to operate until pointer 270 reaches the "Fan Off-On" position, at which switch 263 is opened to break the circuit to the fan. Preferably, about 10 minutes is provided for operation of fan 40 after the burner 38 is shut off, in order to assure clearance of all gases from the housing 22 as well as any ash particles or the like which might be in the combustion chamber after the burner is shut off, and for cooling of the combustion chamber.

Generally speaking, the described drive mechanism and control means are constructed and arranged to provide for the following normal sequence of operation. First, as the seat forming portion 30 is depressed, as by the weight of an occupant, the button switch 262 (FIGURES 1 and 10) underlying the seat is depressed to thereby close the circuit to the fan 40 and start the fan in operation. The circulation of air through the housing 22 and out of the vent 42 lowers the pressure within the housing 22 and evacuates the air and other gases in the housing through the vent 42 at the rear thereof. The fan will continue in operation at least as long as the seat 30 is depressed.

After the disposal unit has been used, the cover 32 is closed and this action serves, through the operation of the latch member 216 connected to the shaft 218 at the rear of the cover, to trip toggle 206 and start the actuator switch 204 controlling the motor 190 which drives the main drive shaft 86. The operation of the drive shaft rotates the crown cam 180 at the forward end of drive shaft 86 to initially raise the crown 64 to its elevated and telescoped position, as seen in FIGURES 1 and 6. Simultaneously, the drive shaft 86 rotates the duck bill cam 234 to move the duck bills 142 from their retracted position seen in FIGURE 5 to a position of gripping engagement with the leading edge 111 of the sheet material extending through the slot 106. The sheet is drawn across the guide plate 140 and, after drive shaft 86 has been rotated about 50°, clutch 226 is engaged to drive the rotors 66 and 68 so as to fold over the top sections of the previously formed disposable receptacle B, deposit the receptacle in the combustion chamber, and ultimately present the succeeding set of vanes 74c, 74c' and 74d, 74d', respectively, in position to form the new bottom and side walls for the bowl structure. When the duck bills 142 have drawn the sheet all the way across the guide plate 140 to their retracted position, the cutter cam 132, which turns simultaneously with the crown and duck bill cams, actuates cutter 102 to cut the sheet at its opposite end adjacent the guide slot 106. The duck bills 142 then strike the cams 156 with their cam followers 153 to open the gripping fingers 144 and 146 and release the sheet for support thereof entirely by the guide plate 140 at a position above the rotors. At this time, the rotors 66 and 68 have stopped and the crown 64 makes its downward movement, through continued rotation of the crown cam 180, to engage the paper and dish or form the paper within the bottom and side walls provided by the vanes 74 of the rotors 66 and 68. The crown 64 is then retracted to its uppermost position.

After the packaged waste material is deposited in the combustion chamber 36, the timer 260, seen in FIGURE 11 and disposed on the top wall of the housing 22, is manually operated, as indicated above, to provide for a selected period of operation of the burner 38 and fan 40, as determined by the position of the indicator 270 relative to one of the numbered positions.

In connection with the starting of the blower fan 40 by the button switch 262 disposed just below the seat 30, it should be noted that this switch is arranged in parallel with the timer fan switch 263, so that the fan 40 will operate either when the user is on the seat or when the timer is operating. As a safety precaution, a normally closed switch may be placed in series with the actuator switch 204 and connected for operation by movement of the seat cover 32, so that the opening of the cover 32 stops the entire drive mechanism and, consequently, the rotors 66 and 68 will not operate with the seat uncovered.

In an experimental embodiment of this invention, there was provided a housing of approximately 32 inches in width, 22 inches deep and 19 inches high. The combustion chamber was approximately 2300 cubic inches in volume, with the usable volume of the bowl, as determined by the rotor structures 66 and 68, being about 280 cubic inches. The burner mechanism 38 was particularly adapted for bottled propane gas, which was introduced into the jet nozzle at about 30 to 40 lbs. per square inch. The blower fan 40 was a squirrel cage fan having a capacity of about 160 cubic feet per minute. The burner 38 was selectively operable over a period of between 10 and 120 minutes, with the fan 40 operating for a period of 10 minutes after shutting off the burner. The heat produced by the burner at the hot point of its flame was in the range of 1500° to 1800° F., and it is considered that a range of from 800° F. to 2000° F. will serve for the intended purposes of this unit.

With the foregoing structure, there is achieved essentially complete combustion of the waste materials, so that the only materials to be disposed of are gases and volatilized materials which are vented through a suitable duct at the rear of the housing 22. This is achieved largely through the use of very intense heat in the presence of an excess of air which flows through the chamber 36 during combustion of the waste material and at a relatively high velocity. The very small percentage of inorganic matter remaining after combustion is discharged through vent 42 as finely divided particles which are relatively indiscernible.

It is also to be noted that the described unit affords constant use, and it is not necessary for the unit to have completed its cycle of operation before being used again. The described construction and arrangement of parts permits occupancy of the seat at any time without interrupting the operation of the burner and fan, and the upper portion of the housing and the seat is kept sufficiently cool to be comfortbale to the occupant at all times. Of course, if the above mentioned safety switch is employed to stop motor 190 when seat cover 32 is raised, the unit will be unavailable for the brief period required to package and dump the waste material and form a new basket or liner at the bottom of the bowl structure 34. Since these operations require a very short time, approximately 15 seconds with the described apparatus, this does not seriously detract from the constant usage of the unit.

The operation of the rotors 66 and 68 might be modified, as illustrated in FIGURES 13 and 14, to provide for a delay in the initial movement of one rotor (rotor 68 in the modification), so that one of the upwardly extending vanes lags behind the other in their downward movement toward each other. The effect of this motion is that the opposite side walls of the disposable basket or receptacle B are folded in sequence to provide an overlap of the opposite sides of the package, thereby providing a different closure for the package than that provided by the principal embodiment. Although other suitable drive means may be provided to achieve the described lag in the movement of the rotors, FIGURE 14 illustrates one form of driving connection which can be used. The shaft 80 for rotor 66 has fixed thereto an elliptical gear 300 which engages a second elliptical gear 302 on shaft 80' mounting rotor 68. The drive chain 84 described above drives the rotor 66, through the sprocket 82, and rotation of rotor 66 effects rotation of rotor 68 by virtue of the engagement of elliptical gears 300 and 302. The latters gears are designed, of course, to provide a variation in the rate of rotation of the two rotors 66 and 68 during at least a portion of their cycle, with the rotors completing their cycle simultaneously so as to properly position the vanes in their receptacle forming position. As indicated in FIGURE 13, the vane 74b initially moves through an angle indicated as x while the opposite vane 74b' moves through the smaller angle y, thereby placing the left side of the basket B in overlapping relation to the right side wall. Continued movement of the rotors completes the closing of these side walls as the basket is dropped into the underlying combustion chamber.

Various of the features disclosed herein are also disclosed in the copending application Serial No. 791,189, filed February 4, 1959, of which the present application is a continuation-in-part.

I claim:

1. In an individual waste disposal unit having an enclosed housing structure with an opening in the top wall thereof, a receptacle in said housing disposed below the top wall opening and comprising a pair of rotors which provide side and bottom portions of the receptacle, each of said rotors comprising a plurality of vane members radially spaced about the longitudinal axis of said rotor and an end wall fixed at opposite ends of said vane members in generally transverse relation thereto, means rotatably mounting said rotors in said housing in closely spaced, parallel relation and for rotation about said longitudinal axes, means connected with each of said rotors for rotating them toward each other and in unison relative to a receptacle-forming position where a first of said vane members on one of said rotors is generally parallel with a first of said vane members on the other of said rotors, to provide opposite side walls for said receptacle, and where a second vane member on said one rotor is generally coplanar with a second vane member on said other rotor to form the bottom of said receptacle, and means in said housing which is operable to form a flexible sheet of disposable, fluid impervious material into an open-top container lining the walls and bottom of said receptacle in position to receive waste material through said top wall opening, the movement of said rotors toward each other being effective to fold the side walls of the open-top container into closing relation and thereby package the waste material as the container is released by said vane members to drop into an underlying portion of said housing.

2. In an individual waste disposal unit having an enclosed housing structure with an opening in the top wall thereof, a receptacle forming means in said housing disposed below said top wall opening and comprising a pair of rotor structures which provide displaceable side and bottom portions for the receptacle for depositing material accumulated in the receptacle into an underlying portion of the housing structure, each of said rotor structures comprising a plurality of angularly spaced-apart vane members extending radially of the longitudinal axis of said structure, means rotatably mounting said rotor structures in said housing in closely spaced, parallel relation, means for rotating said rotor structures about said longitudinal axes toward each other and relative to a receptacle forming position where a first of said vane members on one of said rotors is generally parallel with a first of said vane members on the other of said rotors and a second vane member on said one rotor is generally coplanar with a second vane member on said other rotor, thereby forming the bottom and side wall portions of said receptacle, means within said housing operable to provide a sheet of disposable, fluid impervious material in position overlying said rotor structures, means in said housing for forming the sheet into an open-top container disposed in lining relation to said bottom and side wall portions provided by said vane members, with the sides of the container projecting above the upper edges of the vanes forming said side wall portions, whereby said rotation of said rotor structures relative to their receptacle forming position is effective to fold the projecting side portions of the container together and thus close the container as the latter is dropped into an underlying portion of said housing.

3. In an individual waste disposal unit having an enclosed housing structure with an opening in the top wall thereof, a receptacle forming means in said housing disposed below said top wall opening and comprising a pair of rotor structures which provide displaceable side and bottom portions for the receptacle for depositing material accumulated in the receptacle into an underlying portion of the housing structure, each of said rotor structures comprising a plurality of angularly spaced-apart vane members extending radially of the longitudinal axis of said structure, means rotatably mounting said rotor structures in said housing in closely spaced, parallel relation, means for rotating said rotor structures about said longitudinal axes toward each other and relative to a receptacle forming position where a first of said vane members on one of said rotors is generally parallel with a first of said vane members on the other of said rotors and a second vane member on said one rotor is generally coplanar with a second vane member on said other rotor, thereby forming the bottom and side wall portions of said receptacle, means within said housing operable to provide a sheet of disposable, fluid impervious material in position overlying said rotor structures, means in said housing for engaging a central portion of the sheet and pushing said central sheet portion into lining relation to said bottom and side wall portions provided by said vane members to form an open top container, with the sides of the container projecting above the upper edges of the vanes forming said side wall portions, whereby said rotation of said rotor structures relative to their receptacle forming position is effective to fold the projecting opposite side portions of the container into a position of engagement with each other so as to close the container as the latter is dropped into an underlying portion of said housing.

4. An individual waste disposal unit comprising a housing having top, bottom, side and end walls, said top wall having an opening therein, means defining a bowl structure mounted in said housing at a position directly below the opening in the top wall and in communication therewith, said bowl structure comprising an upper skirt portion which extends downwardly from the top wall opening and a lower portion spaced beneath said upper portion and providing a displaceable bottom for said bowl, said lower portion comprising a pair of adjacent, parallel rotor mechanisms each including a plurality of longitudinally extending vane members which are positionable to define a portion of the bottom and lower sections of the side wall of said bowl structure, means within said housing operable to provide a sheet of combustible material in position between said upper and lower portions of said bowl structure, an annular member in said housing disposed in telescoping relation to said bowl structure, means for moving said annular member vertically between a position above said lower portion and a position within said lower portion to form the sheet into an open top container lining the bottom and lower side wall sections provided by said vane members, drive mechanism in said housing connected with said rotor mechanisms and operable to rotate the latter so as to move the vane members which form side wall sections of the bowl structure toward each other and thereby close the open-top container as it is dropped into an underlying portion of said housing, means defining a combustion chamber in said housing below said rotor mechanisms in position to receive the closed container, means in said housing for producing a temperature within said combustion chamber of from 800° F. to 2000° F., and a blower fan in said housing having communication with said combustion chamber and with a discharge vent in said housing, said fan being operable to provide a flow of air through said housing in a path including said combustion chamber and then out said vent.

5. An individal waste disposal unit comprising a housing having top, bottom, side and end walls, said top wall having an opening therein, means defining a bowl structure mounted in said housing at a position directly below the opening in the top wall and in communication therewith, said bowl structure comprising an upper skirt portion which extends downwardly from the top wall opening and a lower portion spaced beneath said upper portion, said lower portion comprising a pair of adjacent, parallel rotor mechanisms each including a plurality of longitudinally extending vane members which are positionable to define a portion of the bottom and lower sections of the side wall of said bowl structure, means within said housing operable to provide a sheet of combustible material in position between said upper and lower portions of said bowl structure, and an annular member in said housing disposed in telescoping relation to said skirt portion and movable downwardly into said lower portion of said bowl structure so as to form the sheet into an open top container lining the bottom and lower side wall sections provided by said vane members.

6. An individual waste disposal unit comprising a housing having top, bottom, side and end walls, said top wall having an opening therein, means defining a bowl structure mounted in said housing at a position directly below the opening in the top wall and in communication therewith, said bowl structure comprising an upper skirt portion which extends downwardly from the top wall opening and a lower portion spaced beneath said upper portion and providing a displaceable bottom for said bowl, said lower portion comprising a pair of adjacent, parallel rotor mechanisms each including a plurality of longitudinally extending vane members which are positionable to define a portion of the bottom and lower sections of the side wall of said bowl structure, means within said housing operable to provide a sheet of combustible material in position between said upper and lower portions of said bowl structure, an annular member in said housing disposed in telescoping relation to said bowl structure, means for moving said annular member vertically between a position above said lower portion and a position within said lower portion to form the sheet into an open top container lining the bottom and lower side wall sections provided by said vane members, and drive mechanism in said housing connected with said rotor mechanisms and operable to rotate the latter so as to move the vane members which form side wall sections of the bowl structure toward each other and thereby close the open-top container as it is dropped into an underlying portion of said housing.

7. A waste disposal apparatus comprising a housing including a top wall having an opening therethrough, a bowl structure supported in said housing at a position directly below the opening in said top wall of the housing and including a pair of rotor mechanisms, with each of said rotor mechanisms including a plurality of vane members disposed to provide bottom and side wall forming portions of said bowl structure, means for rotating said rotor mechanisms together so as to place said bowl structure in communication with an underlying portion of said housing and to position said vane members in their bottom and side wall forming positions closing off said bowl from said underlying housing portion, a combustion chamber disposed in said housing in underlying relation to said rotor mechanisms and having inclined side and bottom forming walls terminating at their lower ends in closely spaced relation at a position generally centrally located with respect to said rotor mechanisms, a gas jet burner in said housing including a nozzle portion adjacent one end of the combustion chamber and directed toward and spaced from said centrally located, lower portion of said combustion chamber to direct a flame at a position directly beneath said bowl structure and at a position below the upper edges of said inclined walls, an exhaust fan in said housing having communication with said combustion chamber and with the atmosphere through a discharge vent in the housing, said fan being located adjacent the end of said combustion chamber opposite said one end, means defining an air intake opening in the upper portion of said housing located so that said fan is operable to draw air through said air intake opening, past said bowl structur and finally through a generally horizontal path located intermediate said rotor mechanism and said combustion chamber and in the general direction of said jet flame, to thereby provide sufficient oxygen to support combustion and to exhaust the gases to the atmoshpere while retaining a relatively cool condition for said bowl structure.

8. An individual waste disposal unit comprising a housing having top, bottom, side and end walls, said top wall having an opening therein, means defining a bowl structure mounted in said housing at a position directly below the opening in the top wall and in communication therewith, said bowl structure comprising an upper portion including a side wall which extends downwardly from the top wall opening and a lower portion providing a displaceable bottom for said bowl, said lower portion comprising a pair of adjacent, parallel rotor mechanisms, each including a pair of end plates and a plurality of longitudinally extending vane members disposed between said end plates, means for simultaneously rotating said rotor mechanisms so as to position said vanes thereon to form the bottom and a lower section of the side wall of said bowl structure and so as to further rotate said mechanisms to open said bowl structure to the underlying portion of said housing, means defining a combustion chamber in said housing below said rotor mechanisms and having inclined side and bottom forming walls terminating at their lower ends in closely spaced relation at a position generally centrally located with respect to said bowl structure, a gas jet burner in said combustion chamber adjacent one end thereof which is directed downwardly toward said centrally located lower portion of said chamber and which is operable to produce a temperature within said combustion chamber of from 800° F. to 2000° F., and a blower fan in said housing having communication with said combustion chamber and with an air discharge vent in said housing, said fan being located adjacent the other end of said combustion chamber opposite said one end, means defining an air intake opening in the upper portion of said housing in a position such that operation of said fan causes air to be drawn into said housing and past said bowl structure and then through a generally horizontal path located intermediate said rotor mechanisms and said combustion chamber and in the general direction of the jet flame, to thereby provide sufficient air to support combustion in said combustion chamber and exhaust the gases out said vent while retaining a relatively cool condition for said bowl structure.

References Cited in the file of this patent

UNITED STATES PATENTS

| | | |
|---|---|---|
| 770,111 | Reece | Sept. 11, 1904 |
| 1,293,141 | McGary | Feb. 4, 1919 |
| 2,771,533 | Osberg | Nov. 20, 1956 |
| 2,835,215 | Harm | May 20, 1958 |
| 2,858,778 | Gleasman | Nov. 4, 1958 |
| 2,882,534 | Jauch et al. | Apr. 21, 1959 |
| 2,903,709 | Blankenship et al. | Sept. 15, 1959 |
| 2,929,342 | Young | Mar. 22, 1960 |

UNITED STATES PATENT OFFICE
CERTIFICATE OF CORRECTION

Patent No. 3,092,049           June 4, 1963

William H. Wood

It is hereby certified that error appears in the above numbered patent requiring correction and that the said Letters Patent should read as corrected below.

Column 8, line 3, for "200° F." read -- 2000° F. --; column 9, line 8, for "adapated" read -- adapted --; line 50, for "bell-chank" read -- bell-crank --; column 10, line 35, for "desiged" read -- designed --; column 17, lines 17 and 18, for "structur" read -- structure --.

Signed and sealed this 21st day of January 1964.

(SEAL)
Attest:
ERNEST W. SWIDER

Attesting Officer

EDWIN L. REYNOLDS

Acting Commissioner of Patents